Jan. 11, 1927.
C. H. SCHAFER
1,614,155
TROLLEY WHEEL
Filed July 11, 1922
Fig. 1.
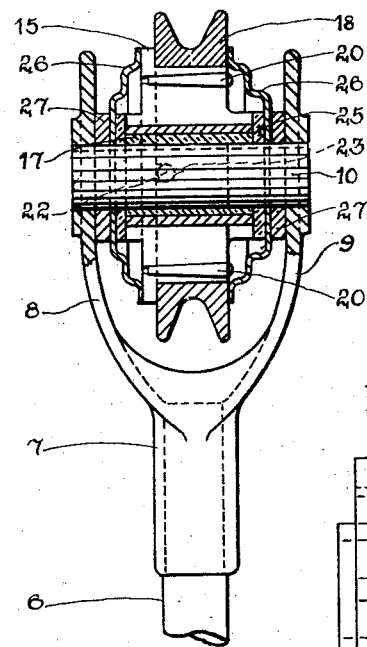
Fig. 2.
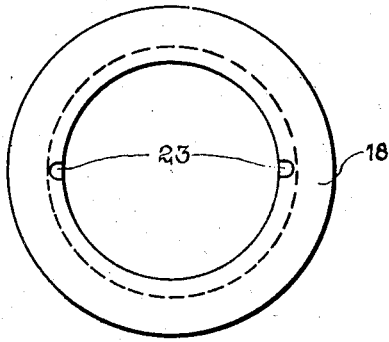
Fig. 3. Fig. 4.
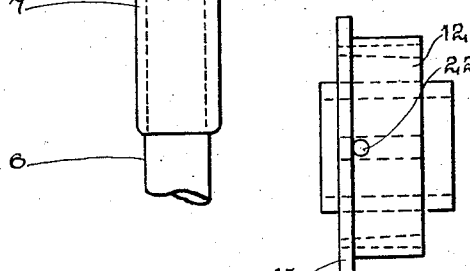 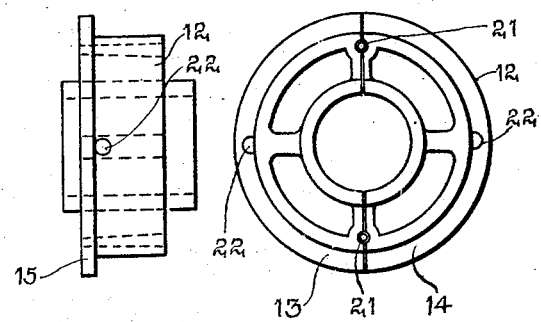
Fig. 5.
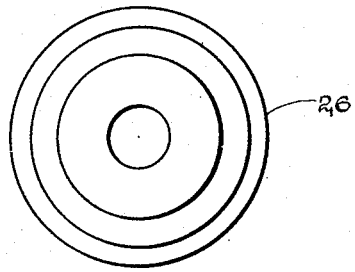
WITNESSES:
C. N. Cochran
R. Martin
INVENTOR
Carl H. Schafer.
BY
Wesley G. Carr
ATTORNEY Patented Jan. 11, 1927.

1,614,155

UNITED STATES PATENT OFFICE.

CARL H. SCHAFER, OF SHARPSBURG, PENNSYLVANIA, ASSIGNOR TO R. D. NUTTALL COMPANY, A CORPORATION OF PENNSYLVANIA.

TROLLEY WHEEL.

Application filed July 11, 1922. Serial No. 574,200.

My invention relates to trolley wheels and it has for one of its objects the provision of a wheel that is simple and durable in construction.

Another object of my invention is the provision of a composite wheel of unitary construction but permitting of easy removal and replacement of the various parts thereof.

Still another object of my invention is the simplification and improvement of the general construction of trolley wheels and means for conducting current therefrom.

As shown in the accompanying drawings, Figure 1 is a view, partially in front elevation and partially in section, of a trolley wheel embodying my invention;

Fig. 2 is a view, in side elevation, of the tread of the wheel which I employ;

Figs. 3 and 4 are front and side elevational views, respectively, of the body of the wheel shown in Fig. 1, and Fig. 5 is a view, in side elevation, of one of the contact discs which I employ.

A pole 6, only a portion of which is shown, supports a harp 7 that is provided with arms 8 and 9 which, in turn, support a tubular shaft or sleeve member 10.

The wheel consists of a body portion 12 that may be made in halves 13 and 14 and is provided with a flange 15. The wheel is supported upon the shaft 10, through an insulating member 17.

A tread 18 is mounted upon the body portion 12 by sliding it axially therealong until it abuts against the positioning flange 15 after which tapered pins 20 may be driven into the openings 21 between the halves 13 and 14 of the body portion, or hub, 12, causing a spreading movement of the half portions and a consequent tight engagement between the body 12 and the tread 18.

As additional precaution against rotative movement of the tread 18 with respect to the hub member 12, holes are drilled into the member 12, for the accommodation of pins 22. When the tread 18 is being placed in position, a pair of holes 23 therein are brought into interfitting relation with the pins 22.

Between the one end of the bushing 17 and the hub portion 12 is an insulating washer 25. A pair of disc-like conductor members 26 are mounted at opposite sides of the trolley wheel so that current may flow therethrough and through contact washers 27 to the trolley pole 6.

From the foregoing description, it will be seen that I provide a tread that is readily replaceable and a device wherein the members may be assembled, or disassembled, by pressure means only, thus reducing the number of members heretofore thought necessary in trolley wheels having renewable treads.

By providing contact discs 26, current is conducted around the bearing for the trolley wheel, thus preventing injury to the bearing and facilitating the flow of current past the same.

Various modifications in detail and general arrangement may be made without departing from the spirit and scope of the invention, as defined in the accompanying claims.

I claim as my invention:

1. A trolley wheel comprising an axially split body portion, a tread portion and means for expanding the said body portion into engagement with the interior surface of the tread portion.

2. A trolley wheel comprising an expansible body portion, a tread portion and wedge members for expanding the body into engagement with the interior surface of the tread portion.

3. A trolley wheel comprising an expansible body portion, a tread portion and means for expanding the body into engagement with the interior surface of the tread portion, the body and the tread being provided with interengaging portions to prevent relative rotative movement thereof.

4. A trolley wheel comprising a plurality of segmental portions having an annular flange adjacent to one side thereof, a tread portion abutting the flange and means for preventing either rotative or axial movement of the tread with respect to the segmental portions.

5. A trolley wheel comprising a plurality of segmental members collectively adapted to form a body structure, a tread portion, and means operative upon said segmental members for forcing them to engage the interior surface of the tread portion.

6. A trolley wheel comprising a plurality of segmental members collectively adapted to form a body structure, a tread portion, and a plurality of wedge members for forcing said segmental portions to engage said tread portion.

In testimony whereof, I have hereunto subscribed my name this 26th day of June, 1922.

CARL H. SCHAFER.